United States Patent

Schuller

[15] 3,646,259

[45] Feb. 29, 1972

[54] SYSTEM FOR RECORDING AND SCANNING VIDEO SIGNALS ON A DISC

[72] Inventor: Eduard Schuller, Berlin, Germany

[73] Assignee: Telefunken Patentverwertungsgesellschaft m.b.H., Ulm/Donau, Germany

[22] Filed: Feb. 12, 1969

[21] Appl. No.: 798,720

[30] Foreign Application Priority Data

Feb. 13, 1968 Germany ........................P 15 62 038.9

[52] U.S. Cl. ....................................178/6.6 DD, 179/100.2 S

[51] Int. Cl. ..................G11b 19/24, G11b 27/30, H04n 5/78

[58] Field of Search ..............179/100.1 S, 100.3 V, 100.2 T, 179/6.6 DD, 100.4 G, 174.1 B, 6.7, 100.1, 100.2 S; 178/6.7, 6.6 DD, 6.6 A

[56] References Cited

UNITED STATES PATENTS

| | | | |
|---|---|---|---|
| 2,334,510 | 11/1943 | Roberts | 179/100.2 S |
| 3,371,156 | 2/1968 | Frohbach et al. | 179/100.3 X |
| 3,381,085 | 4/1968 | Johnson et al. | 178/6.7 |
| 3,423,524 | 1/1969 | Bradford | 178/6.7 |

*Primary Examiner*—Bernard Konick
*Assistant Examiner*—Steven B. Pokotilow
*Attorney*—Spencer and Kaye

[57] ABSTRACT

A video recording and scanning system includes a disc-type record, and a record player, the record having both video picture signal producing indicia and synchronizing pulse producing indicia recorded on its spiral track, the length of the track-carrying signals for recording each picture being variable to permit greater compression of information on a given track with short spacings, or greater image resolution detail with long spacings, the number of the pulse indicia having a fixed ratio to the number of individual pictures recorded on the disc, the position of each pulse indicium being fixed relative to the position of the indicia for producing each picture, the record player including a scanning means, a comparison circuit and a disc speed varying means, the scanning means being mounted for relative movement along the track and producing both picture signals and pulse signals, the comparison circuit comparing the frequency of the pulse signals to a reference frequency to produce an adjustment signal, and the disc speed varying means being responsive to the adjustment signal to vary the speed at which the record track moves past the scanning head so that the variable length portions of track-carrying signals for producing one image move past the scanning means in the same period of time and produce a constant picture changing frequency which is independent of the length of the track carrying the signals for producing each picture.

6 Claims, 1 Drawing Figure

Patented Feb. 29, 1972 3,646,259
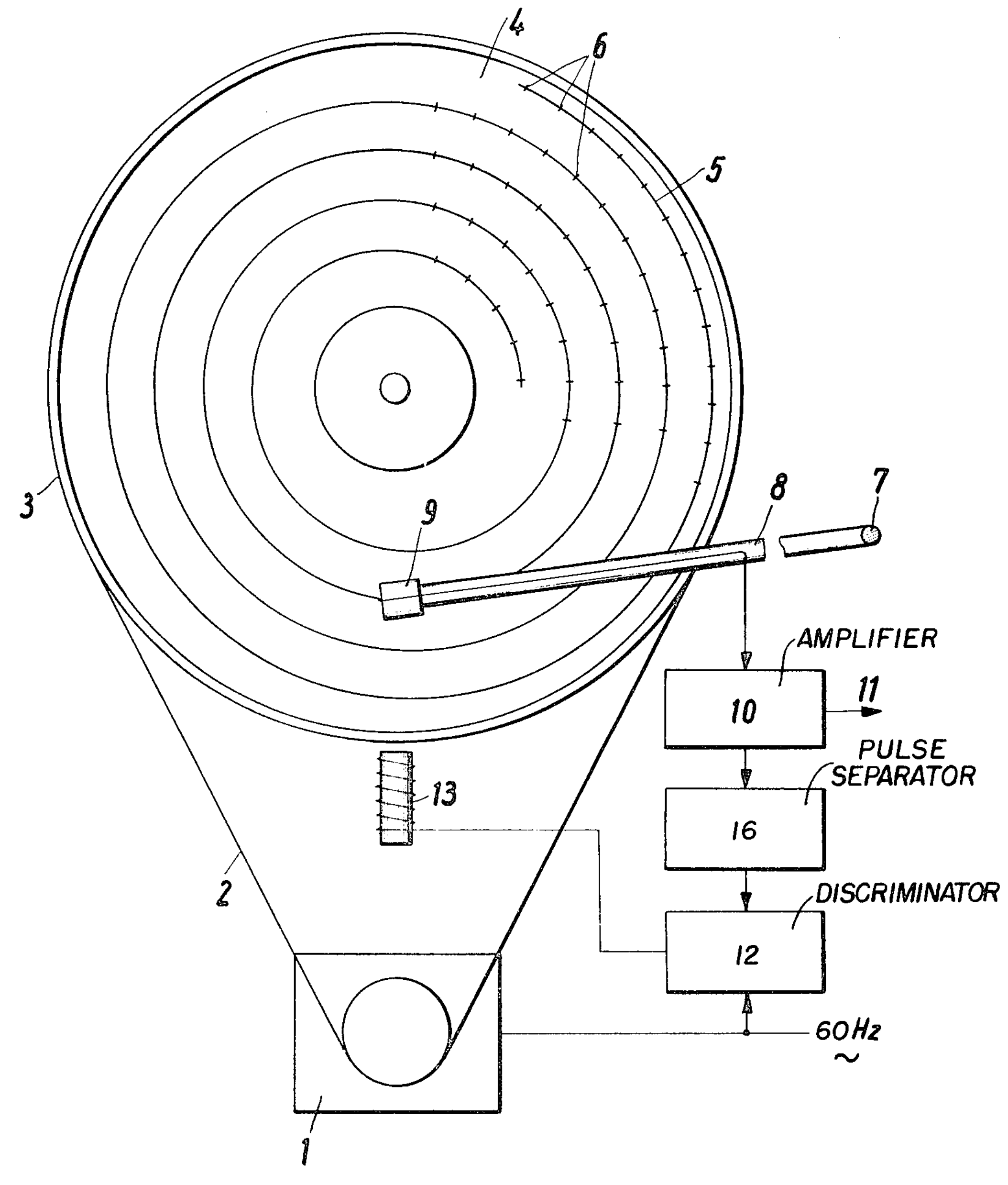
INVENTOR
Eduard Schüller
BY Spencer & Kaye
ATTORNEYS

SYSTEM FOR RECORDING AND SCANNING VIDEO SIGNALS ON A DISC

BACKGROUND OF THE INVENTION

1. Field of the Invention

This invention relates to video recording and more particularly to a system utilizing disc-type records and in which the length of the disc track carrying the signals for producing a single picture may be varied to compress information within a short spacing or permit greater image resolution with a long spacing, and synchronizing pulses recorded on he disc track are utilized to play the individual images at a constant picture changing frequency.

2. Description of the Prior Art

Video signals are normally recorded with magnetic recording processes. If signals for a plurality of consecutive pictures, as for example, a television signal, are to be recorded, tape recorders are generally used, which during recording and playback are driven at uniform forward speed by a transport shaft rotating at a constant speed.

Disc-type records are also used for recording individual pictures. Here the video signal is recorded in a closed circular track and can thus be played back by repeated scanning to produce a still picture on a television screen.

If continuous sequences of pictures are recorded on a disc type record in a spiral track as on phonograph records, there results the drawback, when using the conventional turntable drive operating with constant speed, that the tangential speed changes along the radius and thus also the image resolution capability. The speed of the turntable must therefore be selected to be fast enough that even with the lowest tangential speed, i.e., at the inner end of the recording track, the required image resolution is assured. At the outer edge the frequency resolution is then higher than necessary. Due to the high content of information in video signals the playing time of such records is quite limited.

SUMMARY OF THE INVENTION

Among the objects of the present invention is the provision of a video recording system utilizing disc type ch
a greater amount of information can be carried as compared to the prior art.

A further object of the invention is the provision of such a system in which a constant picture changing frequency may be maintained even though the length of track carrying the indicia for producing a given picture is made shorter to compress more information into a given space, or longer to permit greater image resolution.

Briefly stated, these and other objects are achieved by recording pulses corresponding to the picture-changing frequency along the recording track. The geometrical spacing of the pulses from each other is selected and predetermined according to the desired image resolution. During playback an adjustment value is derived by comparing the frequency of these pulses with a reference frequency. This adjustment value controls the speed of the recording carrier in such a way that a tangential speed results which corresponds to the conventional picture-changing frequency.

In the recording instrument, the means for driving the turntable holding the recording carrier must be so constructed, or so controlled in dependence on the spacing between the recording sound head and the disc center, that with a given speed level of the drive motor or of a gear assembly connected thereto the tangential speed remains constant at each respective recording point. The recording carrier then receives evenly spaced control pulses over the entire length of the recording track. To produce the constant tangential speed known mechanical devices may be used, e.g., a conical friction wheel which is axially displaced in dependence on the forward movement of the recording sound head so that the diameter acting on the turntable is changed.

In the playback instrument a comparison circuit is provided in which the pulses are compared with the net frequency after they have been separated from the scanned video signal, and a brake magnet is associated with the turntable to which magnet an adjustment value is fed which is derived from the comparison circuit when the pulse frequency is different than the net frequency.

To limit the width of the control range it is advisable to provide additional mechanical means for rough tuning the turntable drive which means are controlled in dependence on the scanning radius.

The system according to the present invention not only increases the playing time of the recording carrier, but the playback control means can also be kept uncomplicated since the pulses are already present as part of the video signal required for other reasons.

In addition, the system according to the present invention offers the possibility, depending on the picture content to be used, to adjust the recording speed to be faster or slower without any switching being required in the playback instrument. For example, closeup shots having little detail may be recorded at a relatively slow tangential speed. This results in pulses which are more closely spaced together. Shots which show pictures with much detail or in which it is necessary, for technical or educational reasons, to recognize details very distinctly, can be recorded at a high tangential speed. This results in pulses which are spread at a greater distance along a groove and thus the speed selected during recording determines the frequency resolution capability, due to the resulting spacing of the control pulses on the recording track, and the scanning mechanism automatically adjusts itself to the correct tangential speed so that the number of pictures shown per second corresponds to the conventional picture changing frequency, for example 30 pictures per second in the United States.

BRIEF DESCRIPTION OF THE DRAWINGS

The FIGURE is a schematic representation of a disc record, and a portion of a record player according to the present invention.

DESCRIPTION OF THE PREFERRED EMBODIMENTS

The FIGURE illustrates a turntable 3 holding a disc-type recording 4 driven by a motor 1, for example, by means of a belt 2. The record contains television picture information in a recording track 5 which is arranged in an Archimedes spiral. The television picture information is so recorded that each picture or half-picture takes up the same length of track over the entire length of the track. The synchronizing pulses 6 corresponding to the picture-changing frequency, which for reasons of simplicity are shown only on part of the record, are thus equally spaced from each other. During recording the spacing is selected depending on the picture contents and determines the image resolution during playback which must occur at such a speed that 60 half-images per second are reproduced on a connected television receiver.

Scanning is accomplished in the conventional manner in that a pickup arm pivotally mounted at 7 and provided with a scanning head 9 is used. The picture signal picked up by scanning head 9 is fed into an amplifier 10 having a pulse-separating stage 16. After being amplified, the picture signal 11 than reaches the receiver (not shown). The separated picture-sychronizing pulses are compared in a discriminator 12 with a net frequency source of 60 Hz. The discriminator produces an adjustment value, if there exists a discrepancy, which value is fed to an electromagnet 13 in order to produce a braking force on the turntable 3 of the drive system for the turntable.

If, for example, the turntable rotates too slowly, the frequency of the scanned synchronizing pulses as they are fed to discriminator 12 is too low. The frequency comparison thus results in an adjustment signal which decreases the effective braking moment of the mechanical system. Thus the speed of the turntable is increased. The turntable speed continues to increase until the frequency comparison no longer results in a deviation from the norm, or respectively, the proportional control results in a minimum speed deviation. In corresponding manner, a higher braking moment acts on the mechanical system when the speed of the turntable is higher than the required speed.

In order to keep the range over which the control circuit must be effective at a minimum, it is advisable to provide additional mechanical means with which the speed is regulated in dependence on the scanning radius in such a manner than an approximately constant tangential speed is effected so that it is only necessary for the electronic regulating circuit to effect a fine adjustment. Mechanical means for producing a constant tangential speed as they are used during recording and possibly during playback, are known in the record player art. The high precision required at the recording end is not necessary at the playback end since it is there sufficient to effect a rough adjustment of the tangential speed thus keeping space requirements and production costs down.

The recording carrier may be a record provided with a magnetic layer and impressed guide grooves; it is, however, also possible, as disclosed in an earlier proposal, to use a carrier which can be duplicated in the same way as a phonograph record, in which the information is mechanically impressed into a magnetizable groove and is reproduced by means of a special magnetic head.

The above-described components 10, 12, 16, are per se conventional. For example the amplifier 10 may be of the type shown in the "The application of linear microcircuits, Verlag SGS Fairchild, London-Milan-Paris-Stockholm-Stuttgart 1967," page 100, Figure 3.30, and page 101, Figure 3.31; the pulse-separator 16 may be of the type as used in conventional television receivers, and the discriminator 12 may be of the type as shown in "Fernsehtechnik, zweiter Teil, herausgegeben von F. Schroter, Springer-Verlag, Berlin-Gottingen-Heidelberg 1963," page 51, Abb.: II. 10.

It will be understood that the above description of the present application is susceptible to various changes, modifications and adaptations.

I claim:

1. A video playback system comprising, in combination:

a. a disc record including
  1. a recording track arranged on the disc surface in the form of an Archimedes spiral,
  2. indicia for producing a plurality of individual video picture signals recorded along a length of the track which varies to permit greater image resolution with long spacings, or greater compression of information with short spacings, and
  3. indicia for producing synchronizing pulses also recorded along the track, said pulse indicia being spaced at equal intervals along the track, the number of said pulse indicia having a fixed ratio to the number of pictures recorded on the track and the position of each pulse indicium being fixed relative to an associated length of track carrying indicia for producing a single picture; and b. a record player including
  1. a scanning means,
  2. a comparison circuit connected to said scanning means,
  3. means mounting the disc for movement of the track relative to the scanning means and including speed-varying means connected to the comparison circuit,
  4. said scanning means including means for producing signals from said indicia including both picture signals and,
  5. said comparison circuit including means producing a reference frequency signal and means for comparing the frequency of repetition of pulse signals to the reference frequency to produce an adjustment signal, and
  6. said speed-varying means being responsive to said adjustment signal to control the speed of relative movement between the track and the scanning means to produce a constant picture-changing frequency which is independent of said track length.

2. A system as defined in claim 1, further including recording means for recording means signal indicia on the disc, said recording comprising, a. a support
b. a turntable means for rotating the disc-shaped recording carrier relative to the support about its central axis,
c. a recording head means carried by the support for placing indicia along said recording track,
d. means mounting the recording head for radial movement relative to said disc,
e. a first speed varying means for varying the rotational speed of said turntable to vary the length of said recording track along which indicia corresponding to a given picture are recorded to thereby obtain varied image resolution, and
f. a second speed-varying means for varying the rotational speed of the turntable in accordance with the radial position of the recording head for producing a constant tangential speed of the recording track relative to the recording head which is independent of the speed level set by said first speed-varying means.

3. A system defined in claim 1, in which at least said recording track is made of magnetizable material.

4. A system as defined in claim 1, wherein a. said means mounting the disc include turntable means for rotating said disc about its central axis,
b. said speed-varying means include magnetic brake means for varying the rotational speed of said turntable means, and means utilizing said adjustment signal for controlling said brake means, and
c. said comparison circuit further includes
  1. an AC power source,
  2. means utilizing the frequency of the AC power source to produce said reference frequency, and for producing said adjustment signal.

5. A system as defined in claim 4, wherein said record player further includes means mounting said scanning means for radial movement relative to said disc center, and means responsive to the radial position of said scanning means for adjusting the speed of the turntable drive.

6. A system for recording and playing back video signals employing a disc-shaped recording carrier on which the recording track has the form of an Archimedes spiral comprising recording means for recording pulses corresponding to the picture-changing frequency along the recording track in a constant geometrical spacing from each other which spacing determines the resulting frequency resolution of the recording and can be varied in a predetermined manner according to the frequency resolution to be achieved and playback means for playing back these pulses and for deriving an adjustment value, by means of a comparison of the pulses with a known reference frequency, which adjustment value controls the speed of the recording carrier in such a way as to maintain a tangential carrier speed which results in the playing back of the recorded pulses at a constant frequency, said recording means comprising;

a. a support,
b. a turntable means for rotating the disc-shaped recording carrier relative to the support about its central axis,
c. a recording head means carried by the support for placing such pulses along said recording track,
d. means mounting the recording head for radial movement relative to said disc,
e. a first speed varying means for varying the rotational speed of said turntable to vary the length of said recording track between successive recorded pulses corresponding to the picture-changing frequency are recorded to thereby obtain varied image resolution, and f. a second speed varying means for varying the rotational speed of the turntable in accordance with the radial position of the recording head for producing a constant tangential speed of the recording track relative to the recording head which is independent of the speed level set by said first speed-varying means, and said playback means comprising:

a. a scanning means, b. a comparison circuit connected to said scanning means, c. means mounting the recording carrier for movement of the track relative to the scanning means and including speed-varying means connected to said comparison circuit, d. said scanning means inclu;ing means for producing signals from the recorded pulses, e. said comparison circuit including means producing a reference frequency signal and means for comparing the frequency of repetition of the signals produced from the recorded pulses with the reference frequency to produce an adjustment signal, and f. said speed-varying means being responsive to said adjustment signal to control the speed of relative movement between the track and the scanning means to produce a constant picture changing frequency which is independent of said track length.

* * * * *